United States Patent
Hamada

(10) Patent No.: US 9,444,521 B2
(45) Date of Patent: Sep. 13, 2016

(54) WIRELESS COMMUNICATION SYSTEM AND METHOD FOR TRANSITIONING BETWEEN WIRELESS COMMUNICATION AND WIRELESS POWER TRANSFER

(71) Applicant: CANON KABUSHIKI KAISHA, Tokyo (JP)

(72) Inventor: Masashi Hamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/629,220

(22) Filed: Feb. 23, 2015

(65) Prior Publication Data

US 2015/0171933 A1 Jun. 18, 2015

Related U.S. Application Data

(63) Continuation of application No. 12/864,216, filed as application No. PCT/JP2009/056414 on Mar. 24, 2009, now Pat. No. 8,971,799.

(30) Foreign Application Priority Data

Apr. 4, 2008 (JP) .................................. 2008-098752

(51) Int. Cl.
*H04B 5/00* (2006.01)
*H02J 7/02* (2016.01)

(52) U.S. Cl.
CPC ............ *H04B 5/0037* (2013.01); *H02J 7/025* (2013.01); *H04B 5/00* (2013.01); *H04B 5/0031* (2013.01); *H04B 5/0081* (2013.01); *H04B 5/0075* (2013.01)

(58) Field of Classification Search
CPC .......................... H04B 5/0037; H04B 5/0031
See application file for complete search history.

(56) References Cited

U.S. PATENT DOCUMENTS

| | | |
|---|---|---|
| 6,242,888 B1 | 6/2001 | Cerf |
| 6,316,909 B1 | 11/2001 | Honda et al. |
| 7,598,704 B2 | 10/2009 | Taniguchi et al. |

(Continued)

FOREIGN PATENT DOCUMENTS

| | | |
|---|---|---|
| EP | 0977297 A1 | 2/2000 |
| JP | 10-32526 A | 2/1998 |

(Continued)

OTHER PUBLICATIONS

Machine translation of Terumo Corp., Ishizuka (JP 2002-315209), Oct. 25, 2002.*

(Continued)

*Primary Examiner* — Bobbak Safaipour
*Assistant Examiner* — Devan Sandiford
(74) *Attorney, Agent, or Firm* — Fitzpatrick, Cella, Harper & Scinto

(57) ABSTRACT

The object of the invention is to achieve stable operation of a communication device, which includes an information transmission means and a power transmission means while maintaining communication quality. A mobile device of the invention has an information transmission means for executing non-contact transmission, a power transmission means, a first control means for controlling the information transmission means to repeat an active period and a sleep period, and a second control means for controlling the power transmission means to transmit a power during the sleep period.

20 Claims, 11 Drawing Sheets

(56) References Cited

U.S. PATENT DOCUMENTS

| | | |
|---|---|---|
| 7,750,851 B2 | 7/2010 | Washiro |
| 8,159,183 B2 | 4/2012 | Choi et al. |
| 2001/0003205 A1* | 6/2001 | Gilbert .................... 713/320 |
| 2002/0052563 A1 | 5/2002 | Penn et al. |
| 2005/0068019 A1* | 3/2005 | Nakamura et al. ......... 323/355 |
| 2006/0158152 A1 | 7/2006 | Taniguchi et al. |
| 2006/0183462 A1 | 8/2006 | Kolehmainen |
| 2006/0287763 A1 | 12/2006 | Ochi et al. |
| 2008/0153416 A1 | 6/2008 | Washiro |
| 2008/0211455 A1* | 9/2008 | Park et al. .................. 320/108 |
| 2008/0272889 A1* | 11/2008 | Symons ...................... 340/10.1 |
| 2009/0268747 A1 | 10/2009 | Kurata et al. |
| 2009/0318074 A1 | 12/2009 | Burge et al. |
| 2010/0048126 A1 | 2/2010 | Nishiyama |
| 2010/0142423 A1* | 6/2010 | Zhu ..................... H02J 17/00 370/311 |
| 2010/0152549 A1 | 6/2010 | Tamura |
| 2010/0210207 A1 | 8/2010 | Goto et al. |

FOREIGN PATENT DOCUMENTS

| | | | |
|---|---|---|---|
| JP | 2001-102974 A | 4/2001 | |
| JP | 2002-315209 A | 10/2002 | |
| JP | 2002315209 A * | 10/2002 | ............... H02J 7/00 |
| JP | 2006-201959 A | 8/2006 | |
| JP | 2007-208586 A | 8/2007 | |
| WO | 2007/015599 A1 | 2/2007 | |
| WO | WO 2007015599 A1 * | 2/2007 | |
| WO | 2007043373 A1 | 4/2007 | |
| WO | 2008136050 A1 | 11/2008 | |

OTHER PUBLICATIONS

International Standard "ISO/IEC 18092", Information Technology—Telecommunications and Information Exchange Between Systems—Near Field Communication—Interface and Protocol (NFCIP-1), 2004.

* cited by examiner

WIRELESS COMMUNICATION SYSTEM AND METHOD FOR TRANSITIONING BETWEEN WIRELESS COMMUNICATION AND WIRELESS POWER TRANSFER

This application is a continuation of U.S. application Ser. No. 12/864,216 which is a National Stage of PCT/JP2009/056414 filed Mar. 24, 2009, the contents of each of which are incorporated herein by reference.

TECHNICAL FIELD

The present invention relates to a control technique of controlling an information transmission means for wirelessly transmitting information and a power transmission means for executing non-contact power transmission between communication devices having the information transmission means and power transmission means.

BACKGROUND ART

Conventionally, as a technique of executing close proximity wireless transfer between communication devices using an electromagnetic coupling, for example, an RFID technique and an NFC technique are well known, and are used as an information transmission means. These techniques are defined by the JIS standard "X6319-4: 2005", the ISO standard "ISO 18092:2004", and the like. Note that RFID is an abbreviation for Radio Frequency IDentification and NFC is en abbreviation for Near Field Communication.

On the other hand, there is known a non-contact power transmission means for transmitting a power between opposing devices using an electromagnetically induced electromotive force to charge secondary batteries arranged within the devices.

A communication device which includes the above-described information transmission means and non-contact power transmission means, and is capable of transmitting information and a power in a non-contact manner is expected to be available.

In the case of such communication device, if the information transmission means and the power transmission means are configured to independently operate, electromagnetic induction in the non-contact power transmission means generates noise in wireless communication using the information transmission means, thereby degrading the communication quality.

Therefore, Japanese Patent Laid-Open No. 2001-102974 has proposed to configure the information transmission means and power transmission means to cooperatively operate, and then execute exclusive control. According to this patent reference, when starting an information transmission operation or power transmission operation on the basis of a user instruction, if either of the means is operating, the other means is controlled to deny or suspend the start of the operation.

In the case of the above-described exclusive control, however, even though the remaining level of the secondary battery of the communication device falls into a critical state during information transmission by the information transmission means, charging is not immediately started. Therefore, the secondary battery may be exhausted during the information transmission, thereby causing the communication device to operate unstably.

DISCLOSURE OF INVENTION

The present invention has been made in consideration of the aforementioned problems, and has as its object to achieve stable operation of a communication device including an information transmission means and a power transmission means while maintaining a prescribed communication quality.

In order to achieve the above object, a communication device according to the present invention has the following arrangement. That is, a communication device comprising: information transmission means for executing non-contact data transmission with another communication device; power transmission means for executing non-contact power transmission with the other communication device; first control means for controlling to repeat a transmission period by the information transmission means and a non-transmission period; and second control means for controlling a power transmission by the power transmission means in synchronization with the repetition of the transmission period and the non-transmission period.

According to the present invention, it is possible to achieve stable operation of a communication device including an information transmission means and a power transmission means while maintaining a communication quality.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Preferred embodiments of the present invention will be explained below with reference to the accompanying drawings.

First Embodiment

1. Configuration of Communication System

Figure 1:
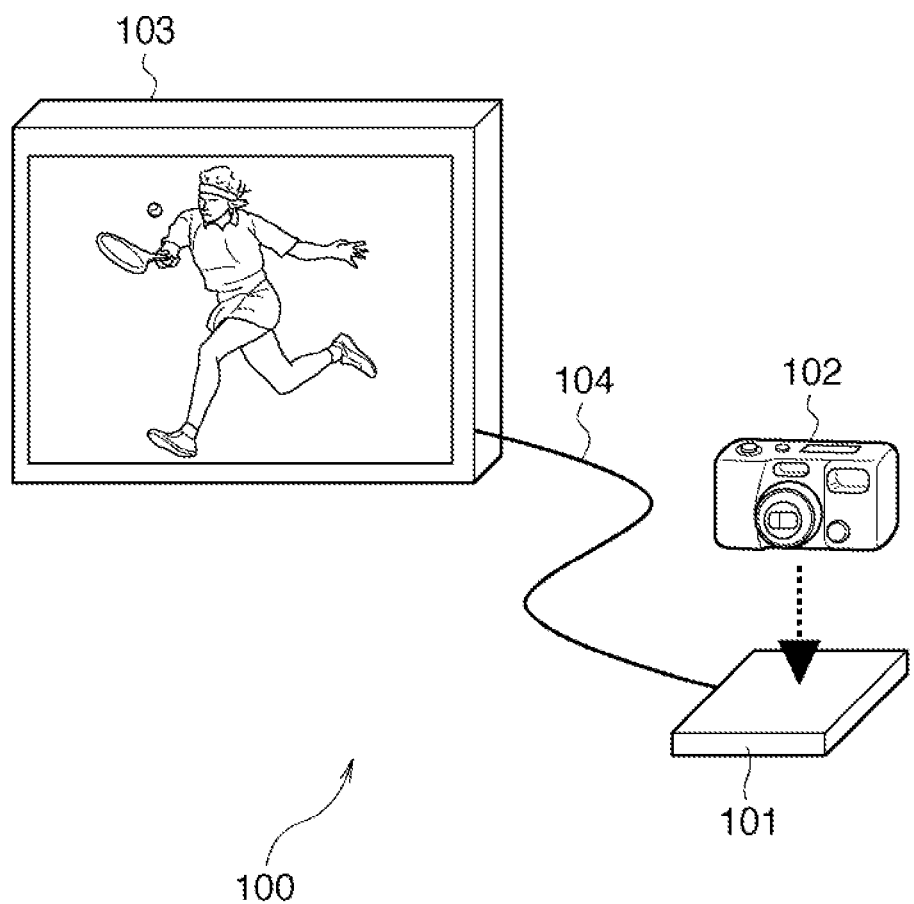
FIG. 1 is a view showing an example of a communication system including communication devices according to the first embodiment of the present invention.

FIG. 1 is a view showing an example of a communication system including communication devices according to the first embodiment of the present invention.

Referring to FIG. 1, reference numeral 101 denotes a port device (communication device). The port device 101 includes an NFC communication means using the NFC technique, which serves as an information transmission means for executing close proximity wireless transfer using electromagnetic coupling. The port device 101 also includes a charging power supply unit serving as a non-contact power transmission means.

Reference numeral 102 denotes a mobile device (communication device) such as a digital camera. Similar to the port device 101, the mobile device 102 includes an NBC communication means. The mobile device 102 also includes a charging power receiving unit serving as a non-contact power transmission means.

Reference numeral 103 denotes a display, which is communicably connected with the port device 101 via a wired communication channel 104.

With the above-described configuration, in a communication system 100, an image stored in the mobile device 102 is transmitted to the port device 101 by only bringing the mobile device 102 close to the port device 101. Consequently, the user can readily display the image within the mobile device 102 on the display 103. In addition, the user can charge a secondary battery within, the mobile device 102.

2. Functional Components of Communication Device

Figure 2:
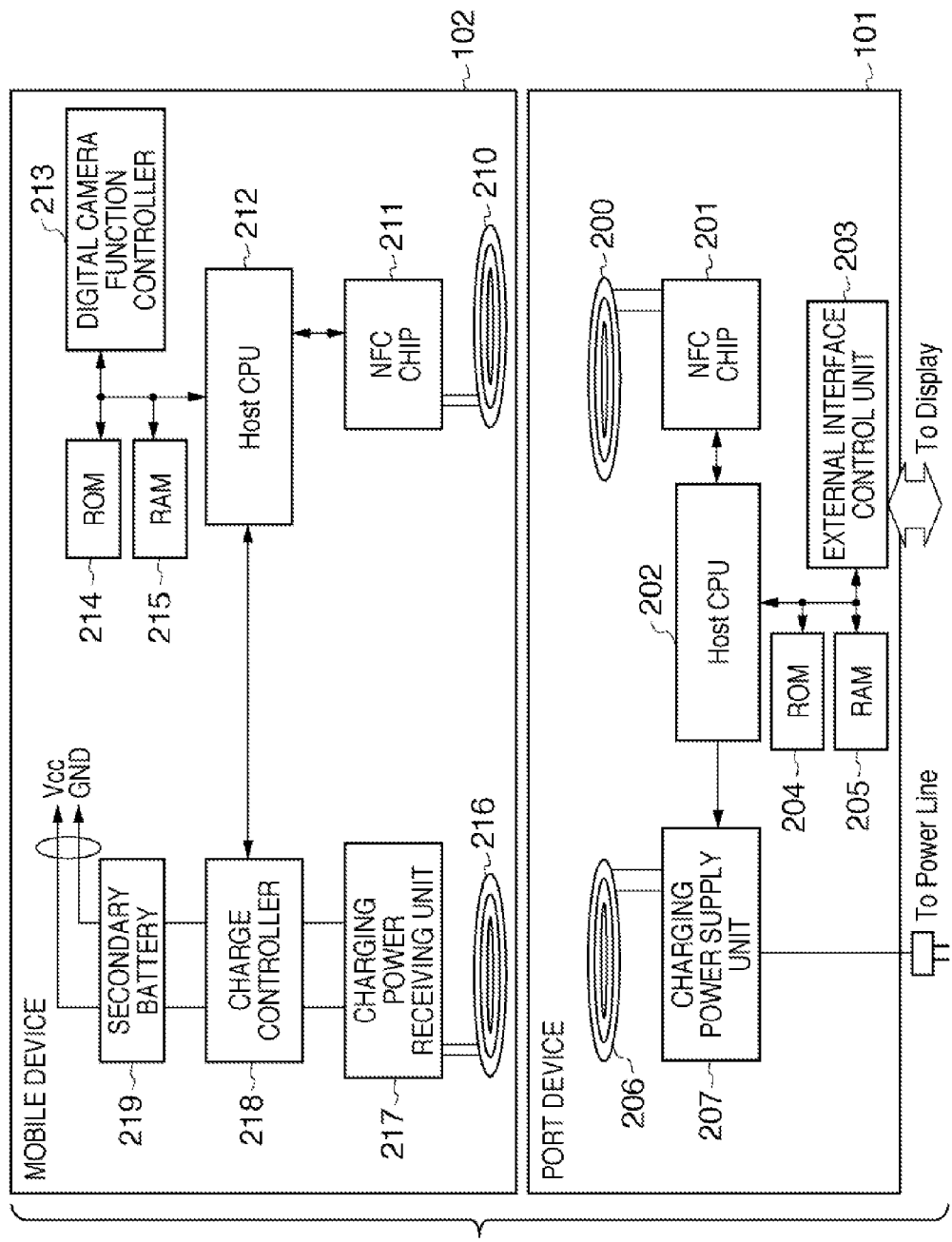
FIG. 2 is a block diagram showing the functional components of a port device and mobile device.

FIG. 2 is a block diagram showing the functional components of the port device 101 and mobile device 102. Referring to FIG. 2, reference numerals 200 and 210 denote wireless communication induction coil units; and 201 and 211, NFC chips for controlling wireless communication processing using the NFC technique. The induction coil units 200 and 210 and the NFC chips 201 and 211 configure the NFC communication means of the communication devices, respectively.

Reference numerals 206 and 216 denote charging induction coil units; 207, a charging power supply unit; and 217, a charging power receiving unit. These components configure the non-contact power transmission means of the communication devices, respectively.

Reference numeral 219 denotes a secondary battery; and 218, a charge controller for controlling charging of the secondary battery 219 using a power transmitted by the power transmission means.

In the port device 101, reference numeral 202 denotes a host CPU for controlling the port device 101 as a whole; and 203, an external interface control unit responsible for wired communication with the display 103.

Reference numeral 204 denotes a ROM, which stores a program for implementing wireless communication/charging processing (to be described later) and various kinds of data used in executing the program; and 205, a RAM, which provides a work area when the host CPU 202 executes the program stored in the ROM 204.

Similarly, in the mobile device 102, reference numeral 212 denotes a host CPU for controlling the mobile device 102 as a whole; and 213, a digital camera function controller for causing the mobile device 102 to function as a digital camera.

Reference numeral 214 denotes a ROM, which stores a program for implementing the wireless communication/charging processing to be described later) and various kinds of data used in executing the program; and 215, a RAM, which provides a work area when the host CPU 212 executes the program stored in the ROM 214.

3. Outline of Wireless Communication/Charging Processing

An outline of the wireless communication/charging processing between the port device 101 and the mobile device 102 will be explained next.

Figure 3:
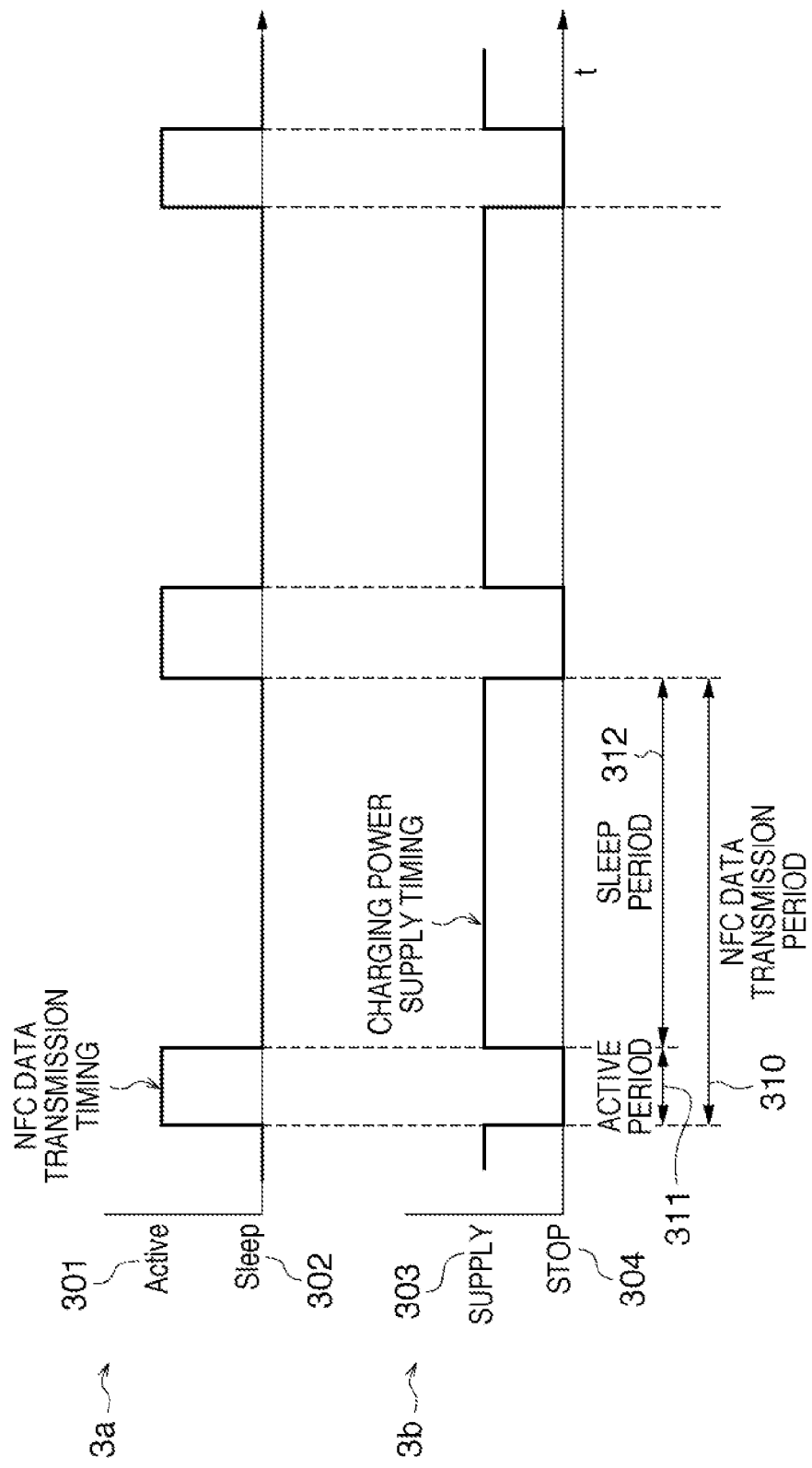
FIG. 3 shows timing charts for explaining an outline of wireless communication/charging processing between the port device and the mobile device.

FIG. 3 shows timing charts for explaining the outline of the wireless communication/charging processing between the port device 101 and the mobile device 102.

3a in FIG. 3 indicates a timing chart showing a timing when the port device 101 and the mobile device 102 use the NFC communication means to execute wireless data (image) transmission. Reference numeral 301 denotes a state in which wireless communication is in an active state (a state in which the mobile device 102 transmits data to the port device 101); and 302, a state in which the wireless communication is in a sleep state (a state in which the mobile device 102 does not transmit data to the port device 101).

As indicated by 3a in FIG. 3, the port device 101 and mobile device 102 are controlled to enter the active state within a certain transmission period (NFC data transmission period) 310. A transmission period (active period 311), during which the wireless communication is in the active state, within the NFC data transmission period 310 varies in accordance with a data amount (information amount) transmitted from the mobile device 102 to the port device 101 within the NFC data transmission period 310.

On the other hand, 3b in FIG. 3 indicates a timing chart showing a timing when the secondary battery 219 of the mobile device 102 is charged by transmitting a power using the power transmission means. Reference numeral 303 denotes a state in which the port device 101 supplies a power to the mobile device 102, and thus the mobile device is being charged; and 304, a state in which the port device 101 stops supplying the power to the mobile device, and thus the mobile device is not being charged.

As described above, in this embodiment, within the NFC data transmission period 310, the period other than the transmission period (the active period 311) during which the wireless communication processing is executed, i.e., a non-transmission period (a sleep period 312) is assigned to power supply.

4. Details of Wireless Communication/Charging Processing

The details of the wireless communication/charging processing between the port device 101 and the mobile device 102 will be described next with reference to FIGS. 4 to 6. In this specification, assume that a state in which mobile device 102 is placed on the port device 101 is also a non-contact state. That is, assume that NFC communication by the induction coil units 200 and 210 and the NFC chips 201 and 211 is non-contact communication. Assume also that a charging operation by the induction coil units 206 and 216, the charging power supply unit 207, and the charging power receiving unit 217 is a non-contact charge.

Figure 4:
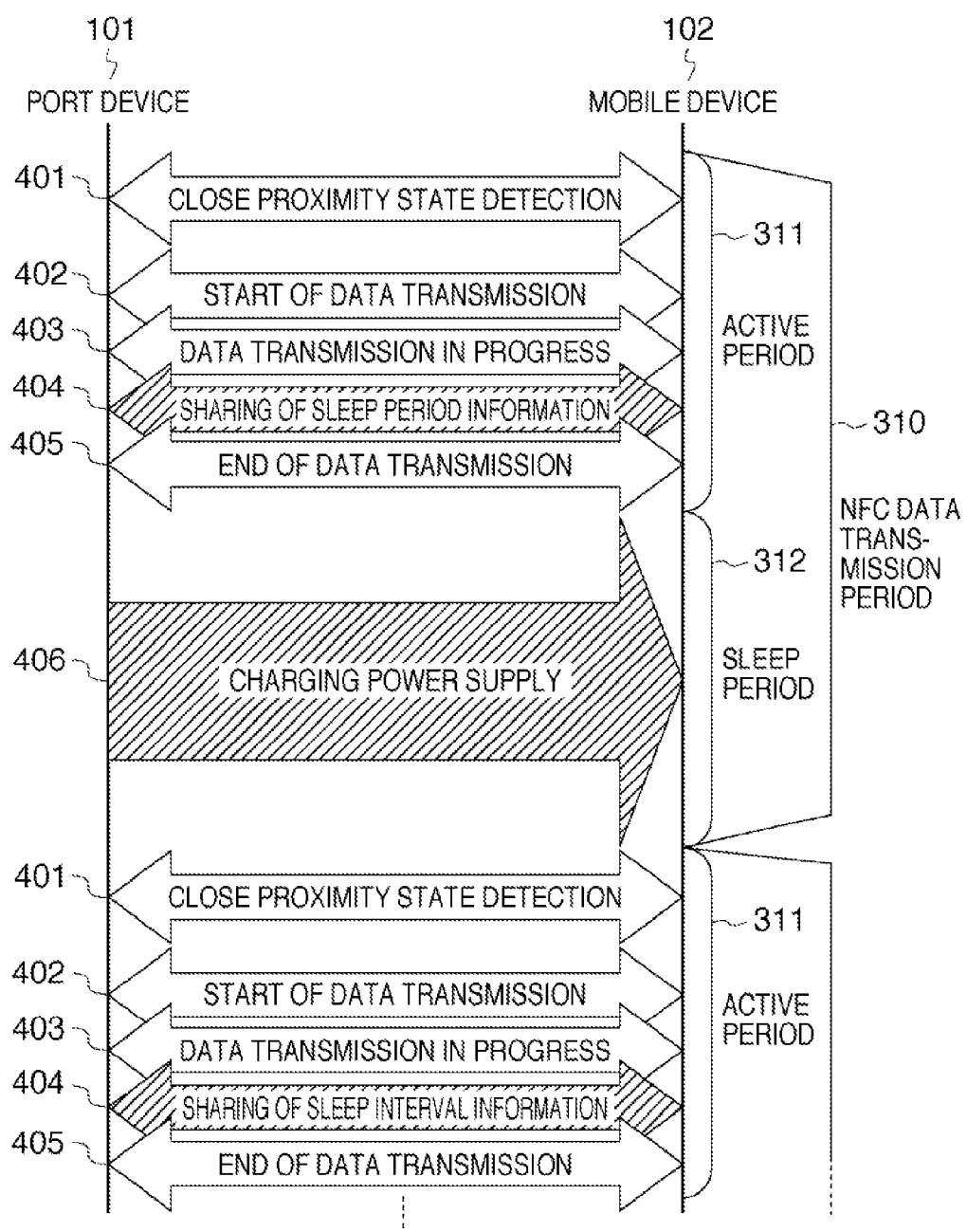
FIG. 4 is a sequence chart showing, in time series, the processing contents executed during active periods and sleep periods.

FIG. 4 is a sequence chart showing, in time series, processing contents executed during the active periods 311 and the sleep periods 312. FIG. 5 is a flowchart illustrating the sequence of the wireless communication/charging processing in the mobile device 102. FIG. 6 is a flowchart illustrating the sequence of the wireless communication/charging processing in the port device 101.

When each of the mobile device 102 and the port device 101 starts the wireless communication/charging processing, the mobile device 102 monitors in step S501 whether the port device 101 is in a close proximity state, while the port device 101 monitors in step S601 whether the mobile device 102 is in a close proximity state.

If the mobile device 102 and the port device 101 respectively determine in steps S502 and S602 that the devices are in the close proximity state with each other (401 in FIG. 4), the process advances to step S503 or S603. Alternatively, if it is determined that the devices are not in the close proximity state with each other, the wireless communication/charging processing ends.

In steps S503 and S603, the mobile device 102 and the port device 101 monitor the wireless communication state, respectively.

In step S504, the mobile device 102 determines whether the wireless communication state is the active state. At this time, the mobile device 102 starts data transmission to the port device 101 (402 in FIG. 4). If the data transmission is in progress (403 in FIG. 4), the mobile device 102 determines that the wireless communication state is the active state, and the process advances to step S505.

On the other hand, the port device 101 determines in step S604 whether the wireless communication state is the sleep state. At this time, the mobile device 102 starts the data transmission to the port device 101 (402 in FIG. 4). If the data transmission is in progress (403 in FIG. 4), the port device 101 determines that the wireless communication state is not the sleep state, and the process advances to step S605.

In step S505, the mobile device 102 determines whether the wireless communication currently in the active state has been started on the mobile device 102 side.

The wireless communication started on the mobile device 102 side indicates that the mobile device 102 side transmits data to the port device 101, thereby achieving the data transmission between the mobile device 102 and the port device 101.

If the mobile device 102 determines in step S505 that the wireless communication has been started on the mobile device 102 side, the process advances to step S506. In the case of the wireless transmission started on the mobile device 102 side, the mobile device 102 can recognize a data amount to be transmitted, and therefore calculate a period (active period) necessary for the transmission.

Since the NFC data transmission period 310 is constant as described above, the mobile device 102 can calculate a next sleep period 312 on the basis of the difference between the NFC data transmission period 310 and the active period 311.

In step S506, the mobile device 102 calculates the next sleep period, and transmits the calculation result to the port device 101. Consequently, information on the next sleep period is shared with the port device 101 (404 in FIG. 4).

On the other hand, the port device 101 determines in step S605 whether the wireless communication currently not in the sleep state has been started on the port device 101 side.

The wireless communication started on the port device 101 side indicates that the port device 101 side reads out data from the mobile device 102 side, thereby achieving the data transmission between the mobile device 102 and the port device 101.

If the port device 101 determines in step S605 that the wireless communication has not been started on the port device 101 side, the process advances to step S607. If the wireless communication has not been started on the port device 101 side, the mobile device 102 side calculates a next sleep period. Therefore, the port device 101 recognizes the sleep period by receiving the information on the sleep period transmitted from the mobile device 102.

In step S607, the port device 101 receives the information on the sleep period transmitted from the mobile device 102. Consequently, the information on the next sleep period is shared with the mobile device 102 (404 in FIG. 4).

Alternatively, if the port device 101 determines in step S605 that the wireless communication has been started on the port device 101 side, the process advances to step S606. If the wireless communication has been started on the port device 101 side, the port device 101 can recognize a data amount to be read out, and therefore calculate a period (an active period) necessary for the readout process. Since the NFC data transmission period 310 is constant as described above, the port device 101 can calculate a next sleep period 312 on the basis of the difference between the NFC data transmission period 310 and the active period 311.

In step S606, the port device 101 calculates the next sleep period, and transmits the calculation result to the mobile device 102. Consequently, information on the next sleep period is shared with the mobile device 102 (404 in FIG. 4).

Similarly, if the mobile device 102 determines in step S505 that the wireless communication currently in the active state has not been started on the mobile device 102 side, the process advances to step S507. If the wireless communication has not been started on the mobile device 102 side, the port device 101 side calculates a next sleep period. The mobile device 102, therefore, recognizes the sleep period by receiving the information on the sleep period transmitted from the port device 101.

When the processes in step S506 or S507 and step S606 or S607 end, and the information on the sleep period is shared, the mobile device 102 advances the process to step S508, while the port device 101 advances the process to step S608.

In step S508, the mobile device 102 stops receiving a charging power. In step S608, the port device 101 stops supplying the charging power. Since a time point (404 in FIG. 4) at which sharing of the information on the sleep period is completed falls within the active period (transmission period), the charging power supply process and the charging power receiving process are in a stop state. In steps S508 and S608, therefore, this state is maintained.

When the data transmission from the mobile device 102 to the port device 101 is completed (405 in FIG. 4), the active period 311 ends, and the sleep period 312 starts.

In this case, the mobile device 102 determines in step S504 that the current wireless communication state is not the active state, and the process advances to step S509. Similarly, the port device 101 determines in step S604 that the current wireless communication state is the sleep state, and the process advances to step S609.

In the step S509, the mobile device 102 determines whether it is in a state in which charging of the secondary battery 219 is unnecessary. The state in which charging of the secondary battery 219 is unnecessary refers to a state in which the charge level of the secondary battery 219 is sufficient or that in which the charge level is in a critical state. Assume that, for example, a charge amount or secondary battery electromotive force is measured, and then whether the charge level is sufficient is determined based on the measurement result. Assume also that, for example, the surface temperature of the secondary battery 219 is measured, and then whether the charge level is in a critical state is determined based on the measurement result.

If it is determined that charging of the secondary battery 219 is unnecessary, the mobile device 102 notifies the port device 101 of it.

In step S609, the port device 101 determines based on the presence/absence of the notification whether the mobile device 102 is in the state in which charging of the secondary battery 219 is unnecessary.

If it is determined in step S509 that charging of the secondary battery 219 is unnecessary, the mobile device 102 advances the process to step S502 to instruct the charge controller 218 to stop receiving the charging power. The charge controller 218 stops receiving the power at the charging power receiving unit 217 on the basis of the instruction. The port device 101 advances the process to step S608 to instruct the charging power supply unit 207 to stop supplying the charging power. The charging power supply unit 207 stops supplying the charging power on the basis of the instruction.

Alternatively, if it is determined in step S509 that the mobile device 102 is not in the state in which charging of the secondary battery 219 is unnecessary, the mobile device 102 advances the process to step S510 to start receiving a charging power. The port device 101 advances the process to step S610 to start supplying the charging power (406 in FIG. 4).

When the sleep period 312 ends, an active period starts. The above-described processing is repeated.

As is apparent from the above explanation, in this embodiment, within an NFC data transmission period, a period other than an active period during which wireless communication processing is executed, i.e., a sleep period is assigned to power supply.

Furthermore, during an active period, a next sleep period is calculated, information on the calculated sleep period is transmitted, and the information on the next sleep period is shared between a port device and a mobile device.

As described above, by automatically executing a process of exclusively controlling wireless communication processing and charging processing within an NFC data transmission period, it is possible to achieve the stable operation of a mobile device while maintaining communication quality in this embodiment.

Second Embodiment

In the above-described first embodiment, each of the port device and the mobile device has the charging induction coil unit and wireless communication induction coil unit, separately. The present invention, however, is not limited to this.

Since the NFC communication means and the power transmission means are controlled to exclusively operate, an induction coil unit may serve as both the charging induction coil unit and the wireless communication induction coil unit, and may be switched to operate as the NFC communication means or power transmission means. The details of this embodiment will be explained below.

1. Functional Components of Communication Device

Figure 7:
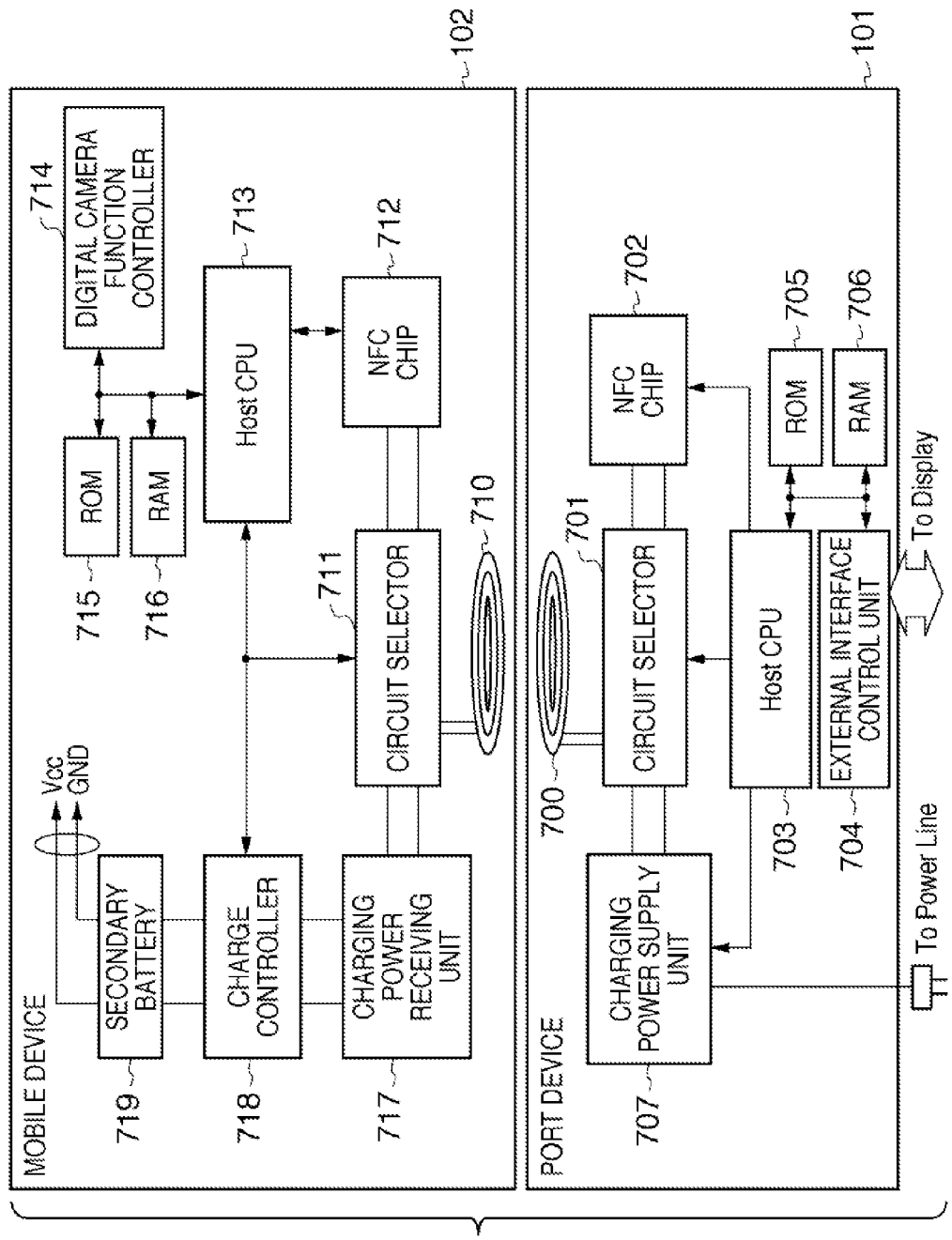
FIG. 7 is a block diagram showing the functional components of a port device and mobile device according to the second embodiment of the present invention.

FIG. 7 is a block diagram showing the functional components of a port device 101 and mobile device 102 according to this embodiment. Note that different points from the functional components (FIG. 2) of the port device 101 and mobile device 102 which have been described in the above first embodiment will be explained.

The port device 101 according to this embodiment has only one induction coil unit 700. The port device 101 also includes a circuit selector (switching means) 701 connected to an NFC chip 702 and charging power supply unit 707. The circuit selector 701 is configured to switch a connection with the induction coil unit 700.

With this arrangement, the port device 101 operates to switch the induction coil unit 700 to the charging power supply unit 707 side, and supply a charging power to the mobile device 102 via the induction coil unit 700 during a sleep period (non-transmission period). The port device 101 operates to switch the induction coil unit 700 to the NFC chip 702 side, and execute data transmission with the mobile device 102 via the induction coil unit 700 during an active period.

Similarly, the mobile device 102 according to this embodiment has only one induction coil unit 710. The mobile device 102 also includes a circuit selector 711 connected to an NFC chip 712 and a charging power receiving unit 717. The circuit selector 711 is configured to switch a connection with the induction coil unit 710.

With this arrangement, the mobile device 102 operates to switch the induction coil unit 710 to the charging power receiving unit 717 side, and receive the charging power from the port device 101 via the induction coil unit 710 during the sleep period. The mobile device 102 operates to switch the induction coil unit 710 to the NFC chip 712 side to switch the connection with the induction coil unit 710, and execute data transmission with the port device 101 via the induction coil unit 710 during the active period.

2. Details of Wireless Communication/Charging Processing

The details of wireless communication/charging processing between the port device 101 and the mobile device 102 will be described next with reference to FIGS. 8 and 9. Note that only different points from the wireless communication/charging processing between the port device 101 and the mobile device 102 which has been explained in the above first embodiment will be described.

In step S810, the mobile device 102 according to this embodiment switches the circuit selector 711 to the charging power receiving unit 717 side, and then starts receiving a charging power.

After the mobile device 102 stops receiving the charging power in step S808, the process advances to step S811 to switch the circuit selector 711 to the NFC chip 712 side.

Similarly, in step S910, the port device 101 according to this embodiment switches the circuit selector 701 to the charging power supply unit 707 side, and then starts supplying a charging power.

After the port device 101 stops supplying the charging power in step S908, the process advances to step S911 to switch the circuit selector 701 to the NFC chip 702 side.

As is apparent from the above explanation, in this embodiment, an induction coil unit serves as both the charging induction coil unit and the wireless communication induction coil unit, and is switched to operate as the NFC communication means or power transmission means. This makes it possible to downsize the mobile device and port device.

Third Embodiment

In the second embodiment, each of the port device 101 and the mobile device 102 has one induction coil unit which serves as both the charging induction coil unit and the wireless communication induction coil unit. The present invention, however, is not limited to this.

For example, an induction coil unit may serve as both a charging induction coil unit and a wireless communication induction coil unit in a mobile device 102, and a charging induction coil unit and a wireless communication induction coil unit may be separately provided in a port device 101.

Alternatively, an induction coil unit may serve as both the charging induction coil unit and the wireless communication induction coil unit in the port device 101, and the charging induction coil unit and the wireless communication induction coil unit may be separately provided in the mobile device 102.

Figure 10:
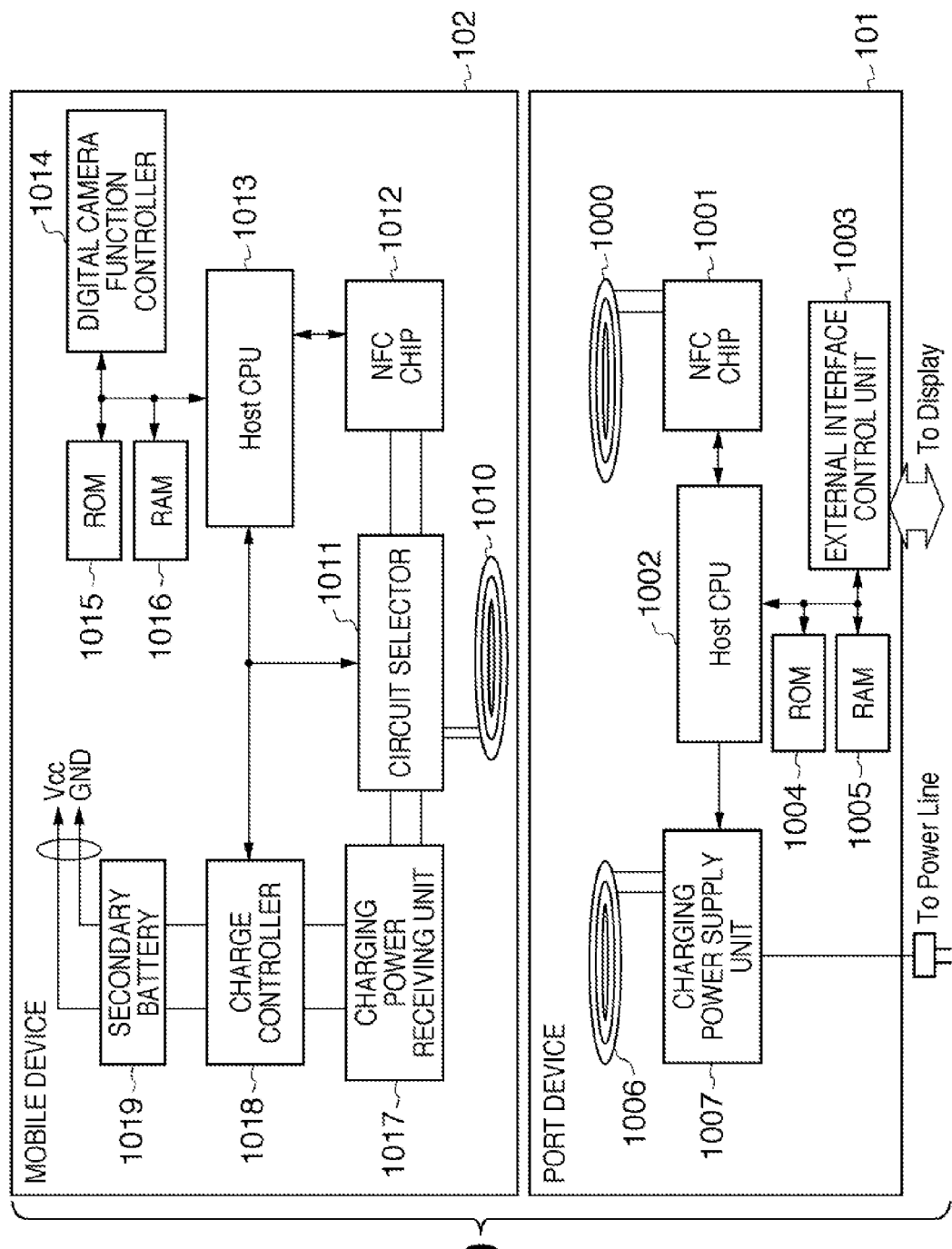
FIG. 10 is a block diagram showing the functional components of a port device and mobile device according to the third embodiment of the present invention.
Figure 11:
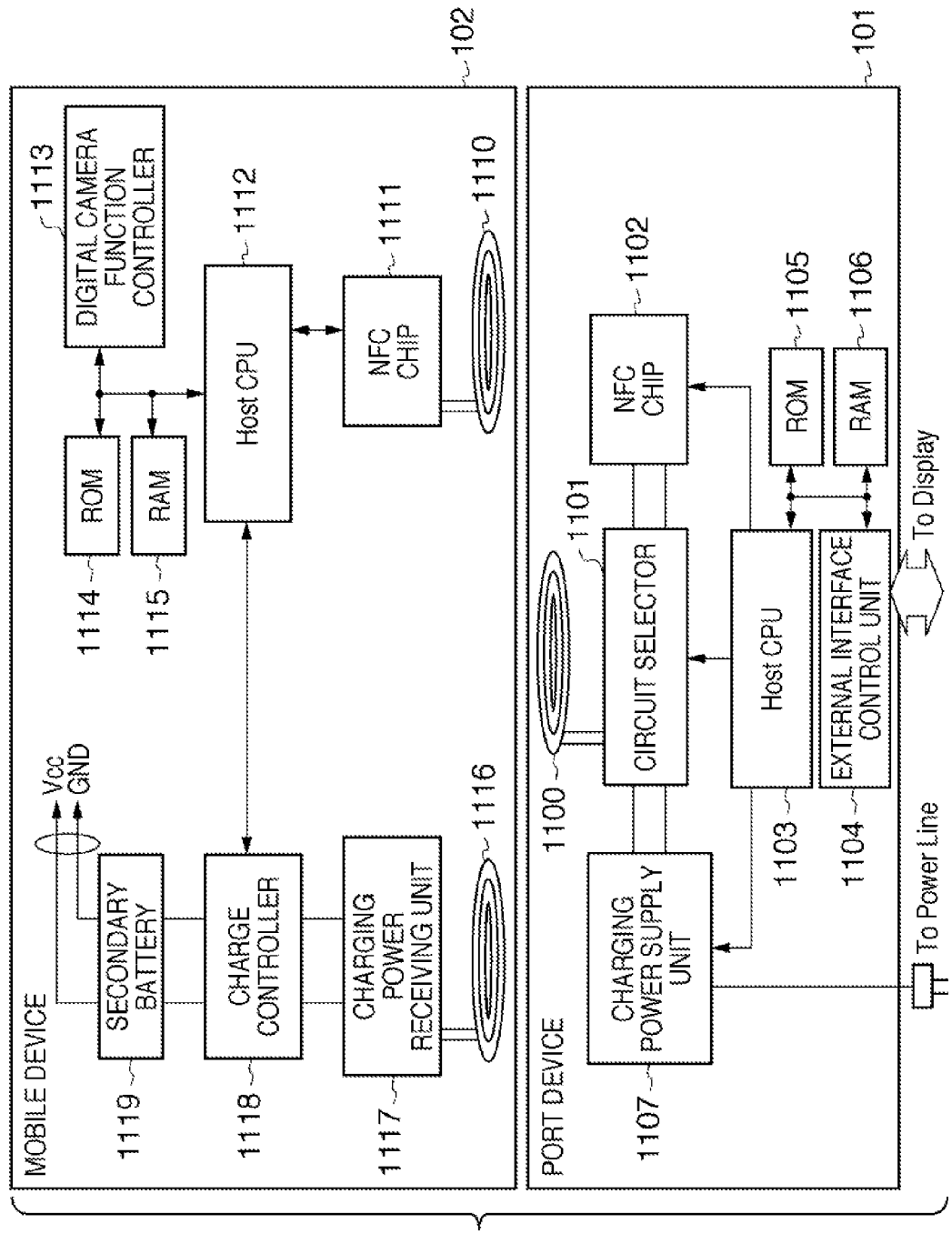
FIG. 11 is a block diagram showing the functional components of a port device and mobile device according to the third embodiment of the present invention.

FIG. 10 is a block diagram showing functional components when an induction coil unit serves as both the charging induction coil unit and the wireless communication induction coil unit in the mobile device 102. FIG. 11 is a block diagram showing functional components when an induction coil unit serves as both the charging induction coil unit and the wireless communication induction coil unit in the port device 101.

FIGS. 10 and 11 show the same functional components as a combination of the functional components shown in FIG. 2 and those shown in FIG. 7, and a description thereof will be omitted.

Figure 5:
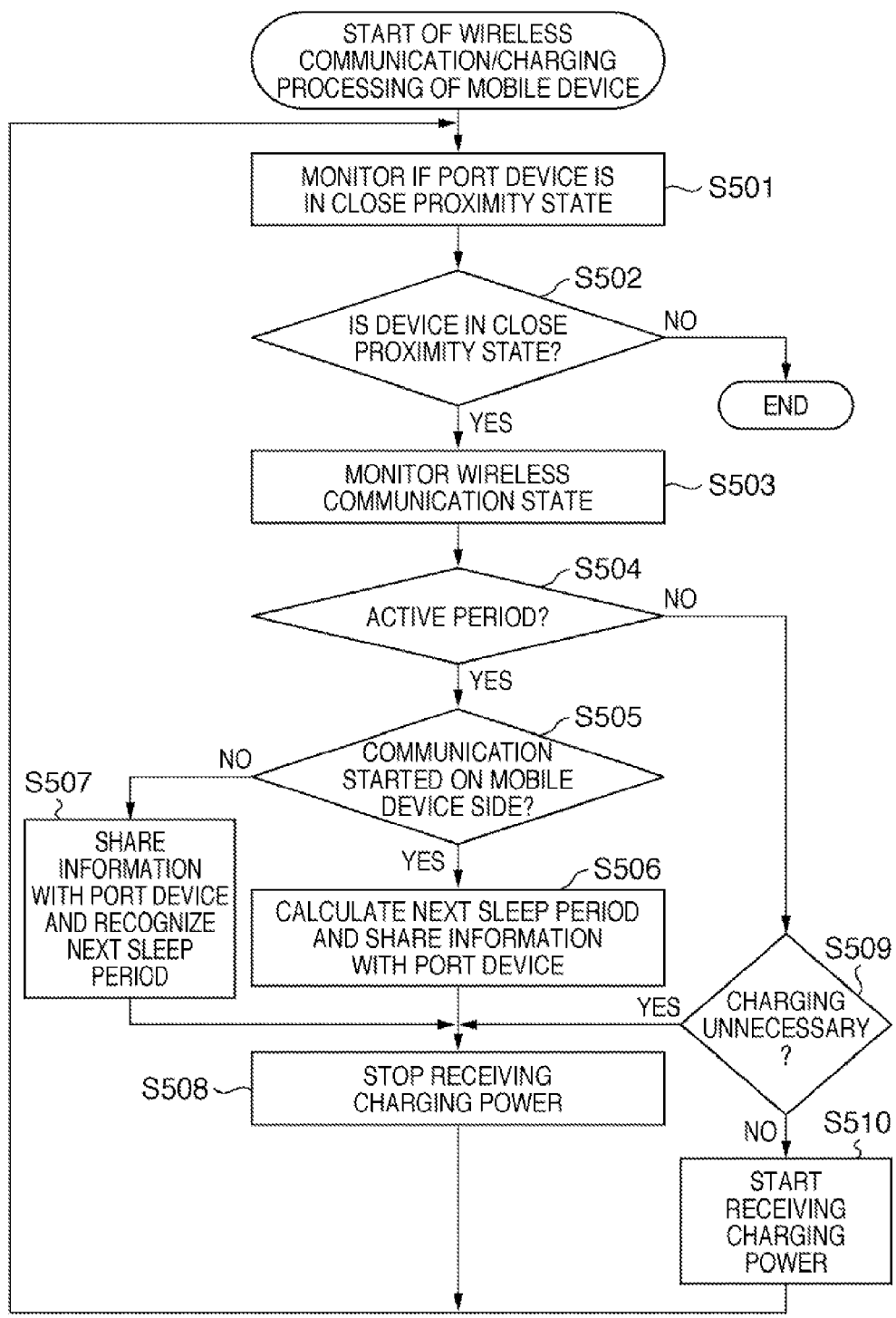
FIG. 5 is a flowchart illustrating the sequence of the wireless communication/charging processing in the mobile device.
Figure 6:
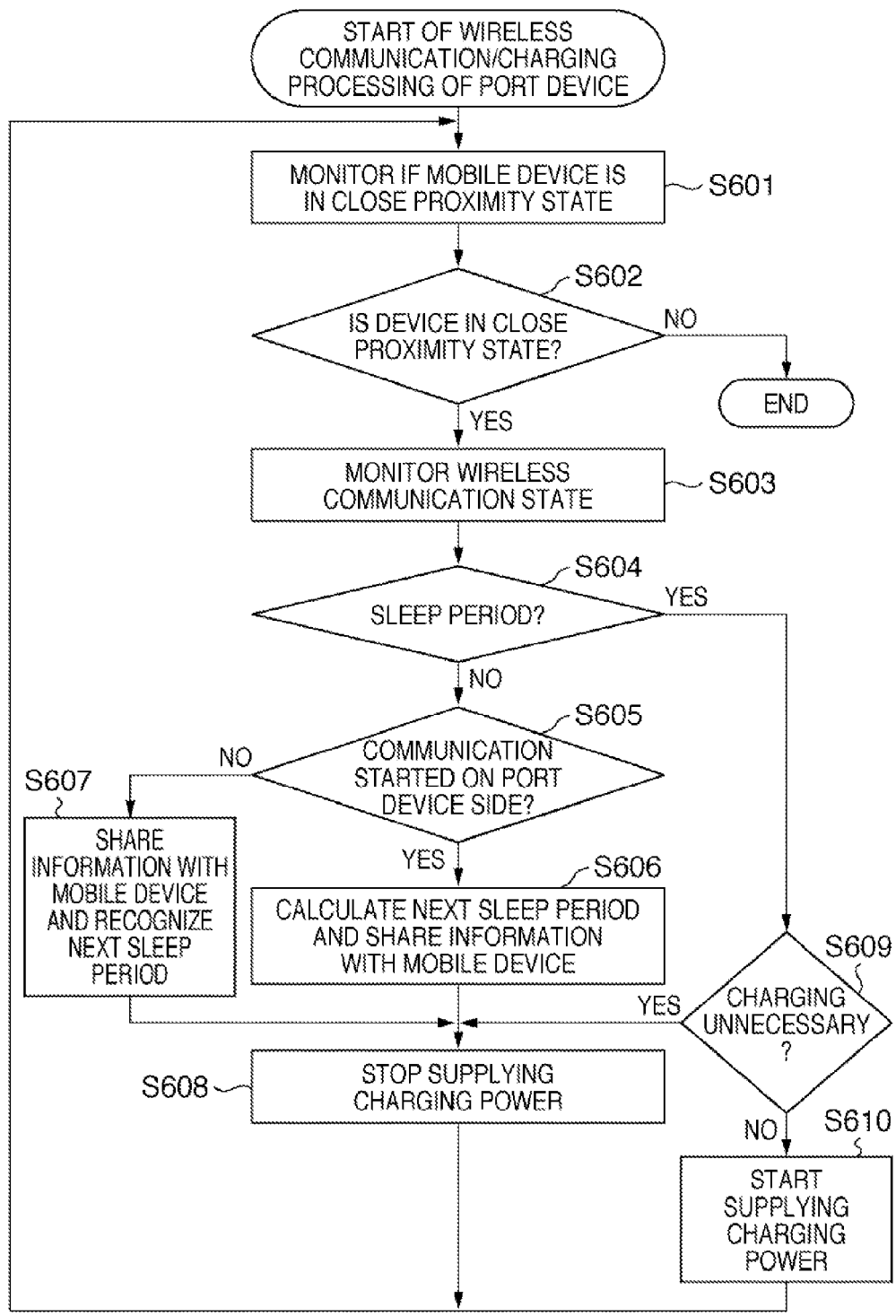
FIG. 6 is a flowchart illustrating the sequence of the wireless communication/charging processing in the port device.
Figure 8:
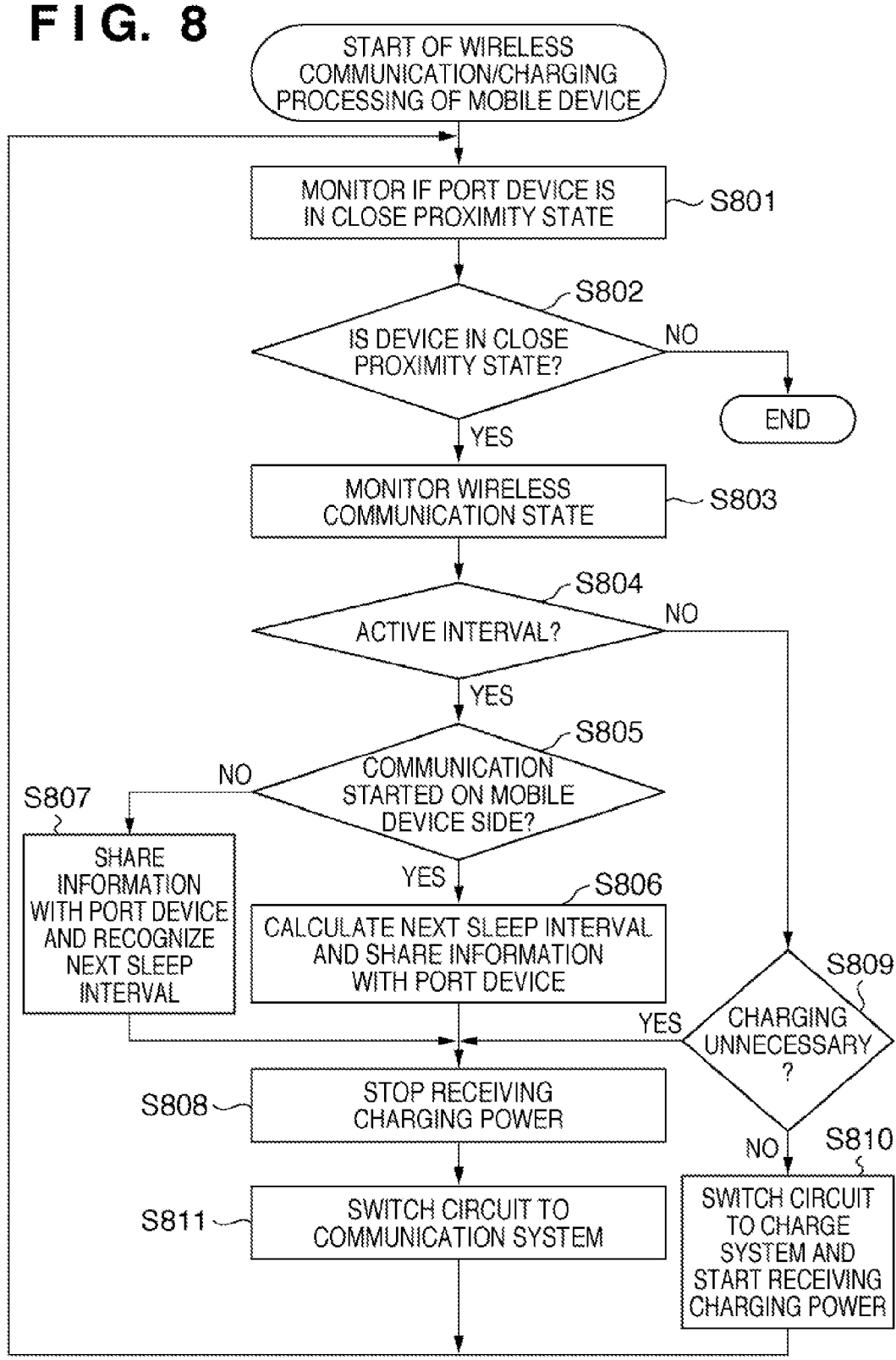
FIG. 8 is a flowchart illustrating the sequence of wireless communication/charging processing in the mobile device.
Figure 9:
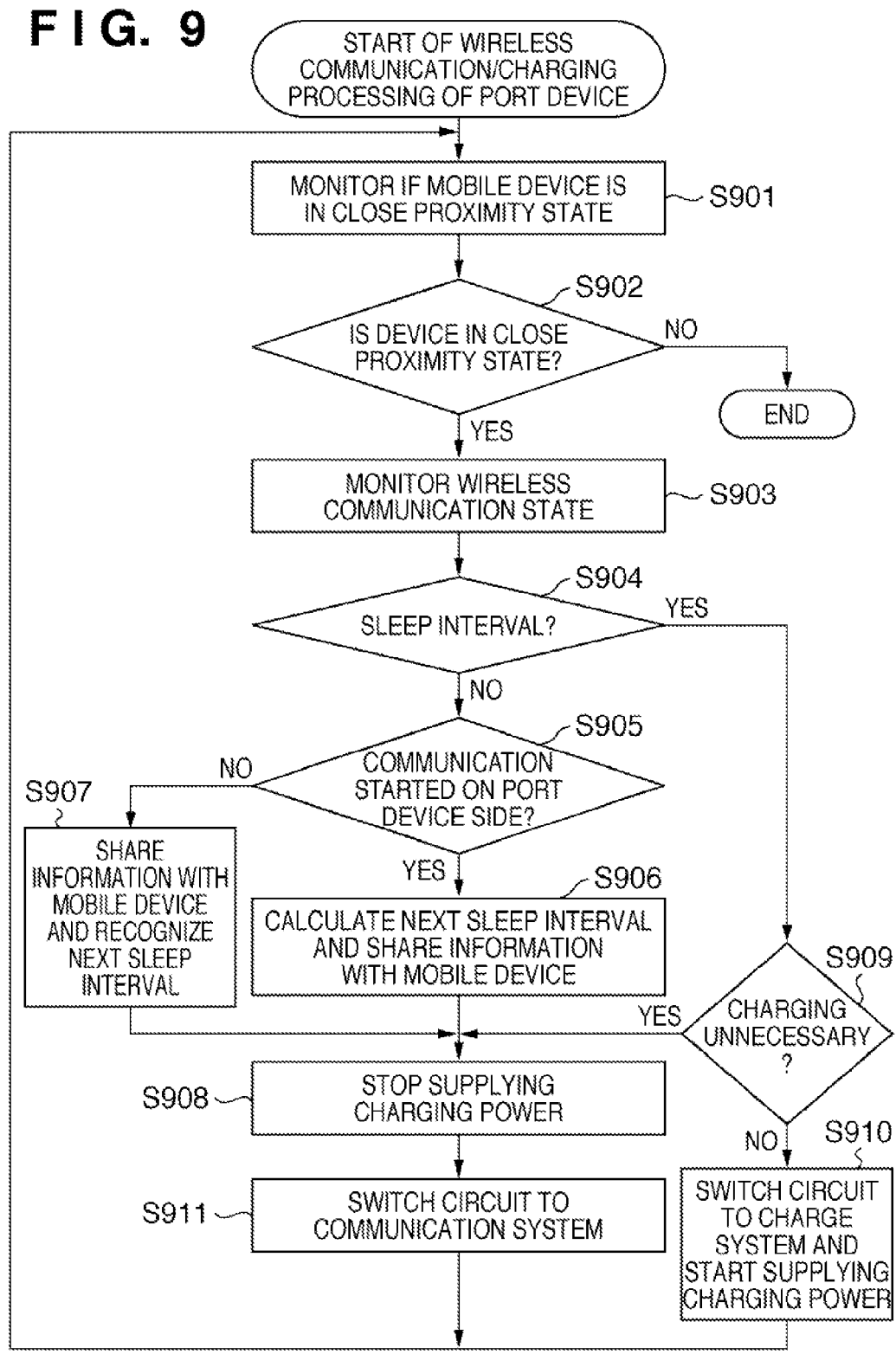
FIG. 9 is a flowchart, illustrating the sequence of the wireless communication/charging processing in the port device.

The sequence of wireless communication/charging processing between the port device 101 and the mobile device 102 each of which has the functional components is the same as a combination of the flowchart shown in FIG. 5 or 6 and that shown in FIG. 8 or 9, and a description thereof will be omitted.

As is apparent from the above explanation, in this embodiment, either of a port device and a mobile device has an induction coil unit serving as both a charging induction coil unit and a wireless communication induction coil unit. This makes it possible to achieve downsizing of the corresponding communication device, and to achieve the cost reduction of the other communication device.

Fourth Embodiment

In the above first to third embodiments, which communication device side has started wireless communication currently in the active state is determined, and the communication device which has started the wireless communication calculates a next sleep period. However, a condition for determining which communication device calculates the next sleep period is not limited to this.

To determine which communication device calculates a sleep period, for example, the RAM capacity (memory capacity) of each communication device may be determined, thereby determining the communication device whose RAM capacity is smaller.

Alternatively, whether the operating power supply of either communication device is a secondary battery may be determined. If the operating power supply of either communication device is a secondary battery, the corresponding communication device may calculate a sleep period.

Furthermore, if the operating power supplies of both communication devices are secondary batteries, the remaining levels of the secondary batteries may be measured. The communication device whose secondary battery remaining level is lower may calculate a sleep period.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a computer-readable storage medium which records software program codes for implementing the functions of the above-described embodiments is supplied to a system or apparatus. The above functions are implemented when the computer (or the CPU or MPU) of the system or apparatus reads out and executes the program codes stored in the storage medium. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which the functions of the above-described embodiments are implemented when an OS (Operating System) or the like running on the computer performs some or all of actual processes on the basis of the instructions of the program codes.

Furthermore, the present invention includes a case in which, after the program codes read out from the storage medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-098752, filed on Apr. 4, 2008, which is hereby incorporated by reference herein in its entirety.

The invention claimed is:

1. A power transmission apparatus comprising:
   a communication controller configured to communicate wirelessly with a power reception apparatus, during a period capable of data transfer, a duration of power transmission to be performed during a period of no data transfer; and a power transmission controller configured to, after the period capable of data transfer, transmit power wirelessly to the power reception apparatus during the period of no data transfer in accordance with the duration communicated by the communication controller.

2. The power transmission apparatus according to claim 1, wherein the communication controller starts to communicate the duration and the power transmission controller starts to transmit power in a case where the power transmission apparatus approaches the power receiving apparatus.

3. The power transmission apparatus according to claim 1, wherein the communication controller transmits the duration information to the power reception apparatus.

4. The power transmission apparatus according to claim 1, wherein the communication controller receives the information from the power reception apparatus.

5. The power transmission apparatus according to claim 1, wherein the power transmission apparatus does not transmit power in a case where the communication controller receives from the power reception apparatus a notification indicating that power reception is not required.

6. The power transmission apparatus according to claim 1, further comprising:
a coil; and
a switch that causes the coil to connect exclusively with the communication controller or the power transmission controller,
wherein the switch causes the coil, based on the duration communicated by the communication controller, to connect with the communication controller during the period capable of data transfer, and to connect to the power transmission controller during the period of no data transfer.

7. The power transmission apparatus according to claim 1, wherein the communication controller communicates wirelessly with Near Field Communication (NFC).

8. The power transmission apparatus according to claim 1, wherein the communication controller communicates with the power reception apparatus during a period capable of data transfer in a wireless transmission cycle, and the power transmission controller transmits power to the power reception apparatus during the period of no data transfer in the wireless transmission cycle.

9. A power reception apparatus comprising:
a communication controller configured to communicate wirelessly with a power transmission apparatus, during a period capable of data transfer, a duration of power transmission to be performed during a period of no data transfer; and
a power reception controller configured to, after the period capable of data transfer, receive power wirelessly from the power transmission apparatus during the period of no data transfer in accordance with the duration communicated by the communication controller.

10. The power reception apparatus according to claim 9, wherein the communication controller starts to communicate the duration and the power reception controller starts to receive power in a case where the power transmission apparatus approaches the power receiving apparatus.

11. The power reception apparatus according to claim 9, wherein the communication controller transmits the duration to the power transmission apparatus.

12. The power reception apparatus according to claim 9, wherein the communication controller receives the duration from the power transmission apparatus.

13. The power reception apparatus according to claim 9, wherein the communication controller transmits a notification indicating the power reception is not required if the power reception apparatus is in a state where power reception is not required.

14. The power reception apparatus according to claim 9:
wherein the power reception apparatus determines whether the power reception apparatus is in a state where power reception is required or not based on at least one of charging condition of a battery, a power of battery, and a temperature of a battery.

15. The power reception apparatus according to claim 9, further comprising:
a coil; and
a switch that causes the coil to connect exclusively with the communication controller or the power reception controller,
wherein the switch causes the coil to connect with the communication controller during the period capable of data transfer, and causes the coil to connect to the power reception controller during the period of no data transfer.

16. The power reception apparatus according to claim 9, wherein the communication controller communicates wirelessly with Near Field Communication (NFC).

17. A control method for a power transmission apparatus comprising:
a communication step of communicating wirelessly with a power reception apparatus, during a period capable of data transfer, a duration of power transmission to be performed during a period of no data transfer; and
a power transmission step for, after the period capable of data transfer, transmitting power wirelessly to the power reception apparatus during the period of no data transfer in accordance with the duration communicated in the communication step.

18. A non-transitory computer-readable storage medium for storing a program which causes a computer to execute a control method, the method comprising:
a communication step of communicating wirelessly with a power reception apparatus, during a period capable of data transfer, a duration of power transmission to be performed during a period of no data transfer; and
a power transmission step for, after the period capable of data transfer, transmitting power wirelessly to the power reception apparatus during the period of no data transfer in accordance with the duration communicated in the communication step.

19. A control method for a power reception apparatus comprising:
a communication step for communicating wirelessly with a power transmission apparatus, during a period capable of data transfer, a duration of power transmission to be performed during a period of no data transfer; and
a power reception step for, after the period capable of data transfer, receiving power wirelessly from the power transmission apparatus during the period of no data transfer in accordance with the duration communicated in the communication step.

20. A computer-readable storage medium for storing a program which causes a computer to execute a control method, the method comprising:
a communication step for communicating wirelessly with a power transmission apparatus, during a period capable of data transfer, a duration of power transmission to be performed during a period of no data transfer; and a power reception step for, after the period capable of data transfer, receiving power wirelessly from the power transmission apparatus during the period of no data transfer in accordance with the duration communicated in the communication step.

* * * * *